(12) United States Patent
Pavlovic et al.

(10) Patent No.: US 6,640,697 B2
(45) Date of Patent: Nov. 4, 2003

(54) FOOD PROCESSOR

(75) Inventors: Henrik Pavlovic, Ljubno Ob Savinji (SI); Jurij Pesec, Petrovce (SI); Igor Zibret, Smartno Ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/260,328

(22) Filed: Sep. 30, 2002

(65) Prior Publication Data

US 2003/0075056 A1 Apr. 24, 2003

Related U.S. Application Data

(63) Continuation of application No. PCT/EP01/02180, filed on Feb. 26, 2001.

(30) Foreign Application Priority Data

Mar. 31, 2000 (DE) .......................................... 100 16 290

(51) Int. Cl.$^7$ .............................. A23L 1/00; A23N 1/00; A47J 43/08; A47J 44/00; B01F 9/00
(52) U.S. Cl. .............................. 99/492; 99/348; 99/511; 241/37.5; 241/92; 366/314; 366/601
(58) Field of Search .......................... 99/484, 485, 486, 99/489, 492, 495, 509–513; 210/360.1, 380.1; 241/37.5, 73, 92, 86.1, 89.3, 282.2, 282.1, 261.1, 101.2, 199.12; 366/314, 601, 205, 206; 426/61, 63, 49, 52, 533, 599; 494/36, 43, 56, 58

(56) References Cited

U.S. PATENT DOCUMENTS 5,863,118 A * 1/1999 Ackels et al. ................ 366/129
6,186,056 B1 * 2/2001 Bruno et al. .................. 99/348

FOREIGN PATENT DOCUMENTS

| DE | 79 02 965 U1 | 6/1979 |
| DE | 41 26 721 C1 | 1/1993 |
| DE | 41 42 074 A1 | 6/1993 |

* cited by examiner

*Primary Examiner*—Timothy F. Simone
(74) *Attorney, Agent, or Firm*—Laurence A. Greenberg; Werner H. Stemer; Ralph E. Locher

(57) ABSTRACT

A food processor includes a housing, an electric motor drive, various tools placed on the housing and coupled to the drive, at least one of the tools having a switching block, and a switching element actuated in two directions. A tool coupled to the motor drive can be operated in only one particular operating mode because one or the other switching direction of the switching element can be blocked as a function of the tool placed on the housing.

18 Claims, 1 Drawing Sheet

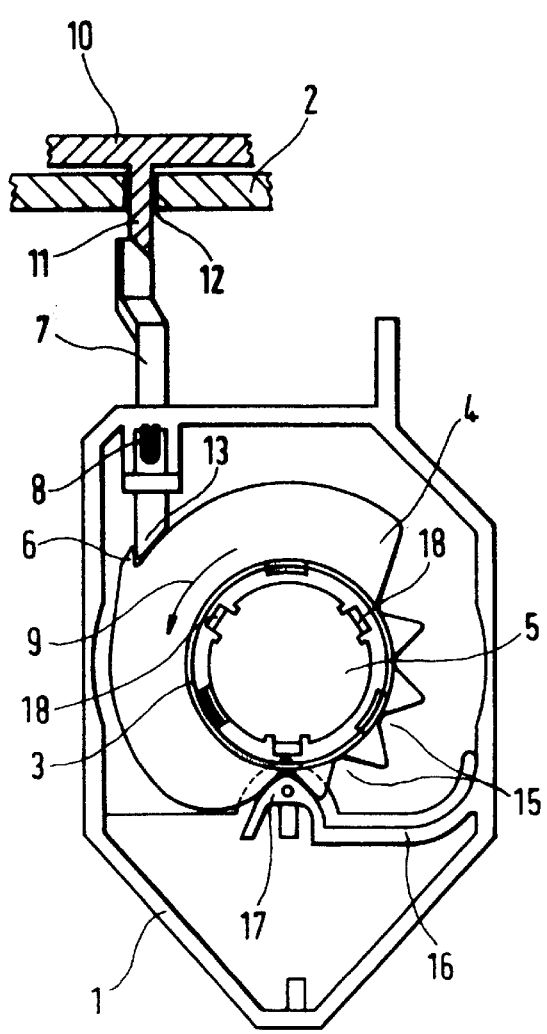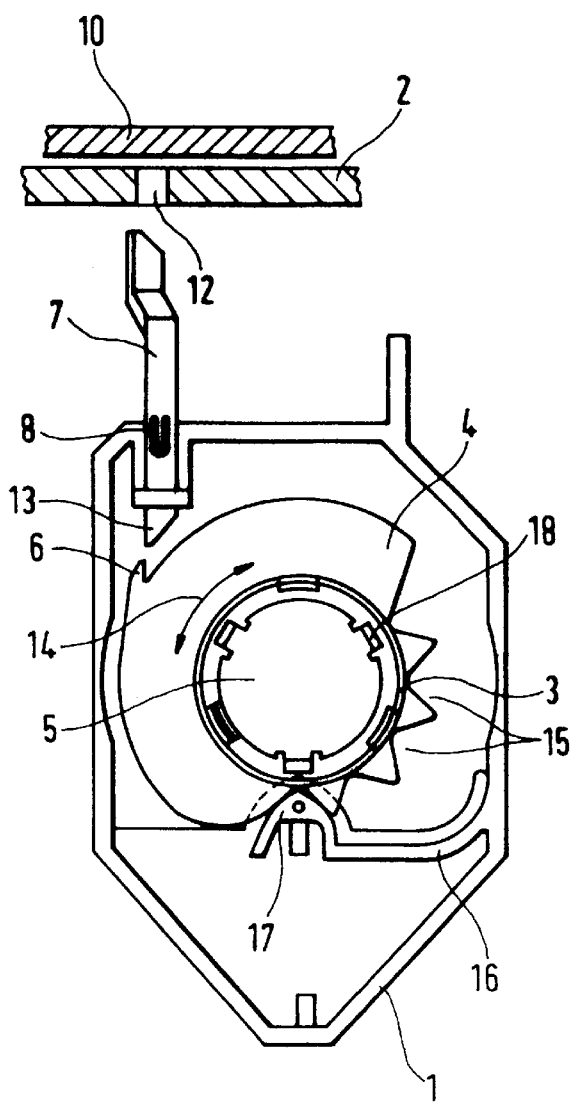

FOOD PROCESSOR

CROSS-REFERENCE TO RELATED APPLICATION

This application is a continuation of copending International Application No. PCT/EP01/02180, filed Feb. 26, 2001, which designated the United States and was not published in English.

BACKGROUND OF THE INVENTION

1. Field of the Invention

The invention relates to a food processor that is provided with an electric motor drive to which can be coupled various tools that can be placed on the housing of the appliance. The food processor further includes a switching element that can be actuated in two directions.

A commercially available food processor includes a switch that can be actuated by twisting. Such a switch is formed in one direction of twisting as a momentary switch, in other words, the switch remains in its "on" position in that direction of twisting only for as long as it is held manually in such a position. When released, the switch is restored by the force of a spring into its "off" position. In the other direction of twisting, the switch can be adjusted successively in various switching steps, in each of which it remains until it is further adjusted manually. Thus, the switch has to be switched off manually. In the prior art food processor, the switch can be twisted in one or the other direction regardless of the type of tool currently coupled to the motor drive of the food processor; in other words, each tool can be used in either momentary or sustained operating mode.

There are tools for food processors with which work is done for the performance of which only one of the two types of operating mode is preferentially suitable. Thus, for example, when chopping work is being done, it is not very advantageous for the chopping to be performed in sustained operating mode. In such a case, working with momentary operating mode is much more favorable.

2. Summary of the Invention

It is accordingly an object of the invention to provide a food processor that overcomes the hereinafore-mentioned disadvantages of the heretofore-known devices of this general type and that only one permits setting of a particular operating mode dependent in each case upon the tool coupled to the appliance.

With the foregoing and other objects in view, there is provided, in accordance with the invention, a food processor, including a housing, different tools adapted to be placed at the housing, an electric motor drive coupled to one of the tools when the one tool is placed at the housing, and a switching element actuated in two switching directions, at least one of the two switching directions being blocked as a function of a given one of the tools placed at the housing.

According to the invention, one or the other switching direction of the switching element can be blocked as a function of the tool placed on the housing of the appliance. Thus, the particular tool coupled thereto specifies the more favorable operating mode. Thus, when a chopping tool is attached, for example, the switch to sustained operating mode is blocked and only momentary operating mode is enabled.

Such a blocking system can be achieved in a structurally simple manner by providing at least one blocking element for one direction of rotation of the switching element on the circumference of a part coupled in a rotationally fixed manner with respect to the switching element, which can be actuated in two directions of rotation, with which part a counter-blocking element that can be coupled to the tool can be brought into engagement.

In accordance with another feature of the invention, the at least one blocking element has an adjustment path, the counter-blocking element is a strip-shaped projection, and each of the tools has the strip-shaped projection projecting into the adjustment path of the at least one blocking element when the tools are respectively placed at the housing.

As a result of providing a strip-like projection projecting into the adjustment path of the blocking element as a counter-blocking element on each tool, with a suitable spatial matching of the switching element to the tool, the blocking of the corresponding switching direction can be performed directly by the tool.

In general, the switch and the tool that can be placed on the housing of the appliance are not in the direct vicinity of one another. In such a case, the desired blocking can be achieved in a simple manner by connecting a connecting disk in a rotationally fixed manner with respect to the switching element, and providing on an outer circumference of the connecting disk a radially outward-projecting blocking tongue. A pushrod that can be actuated as a function of each tool placed in position projects as a counter-blocking element into the adjustment path of the blocking tongue.

As a result of the fact that the pushrod, which is displaceably disposed and is held in its position of rest by the force of a spring, can be adjusted in the blocking direction by an actuating finger provided on the tool in question when the tool is placed on the housing of the appliance, the pushrod can be actuated in a simple manner by the tool.

In accordance with a further feature of the invention, it may also be advantageous if a further blocking element is provided for the other switching direction of the switching element.

In accordance with an added feature of the invention, a merely short-term processing of a foodstuff to be chopped is ensured in that the switching element is formed as a momentary switch at least in one of its switching directions. The tool, then, remains in operation only while the switch is held manually in the "on" position. The user of a food processor is, thus, forced to remain with the food processor so that the user can constantly observe the processing operation and end it at the appropriate time.

If latching recesses are provided on the circumference of the connecting disk, into which recesses a latching tongue fixedly disposed on the housing engages at least for one switching direction of the switching element, the necessary switching positions for sustained operating mode can be set in a simple manner. The switching element is held in its current position by the latching connections between the latching recesses and the latching tongue.

With the objects of the invention in view, in a food processor having a housing and an electric motor drive, there is also provided a switching assembly including different tools adapted to be placed on the housing and coupled to the electric motor drive when one of the tools is placed on the housing, and a switching element actuated in two directions, at least one of the two directions being blocked as a function of a given one of the tools placed on the housing.

Other features that are considered as characteristic for the invention are set forth in the appended claims.

Although the invention is illustrated and described herein as embodied in a food processor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a fragmentary, cross-sectional view of a blocking device provided on a food processor in a blocking position according to the invention; and FIG. 2 is a fragmentary, cross-sectional view of the blocking device of FIG. 1 in a non-blocking position.

DESCRIPTION OF THE PREFERRED EMBODIMENTS

Referring now to the figures of the drawings in detail and first, particularly to FIG. 1 thereof, there is shown a supporting frame 1 secured on the housing 2 of a household appliance, for example, a food processor. A connecting disk 4 is rotatably disposed in a bearing aperture 3 of the supporting frame 1. The connecting disk 4 includes a receiving aperture 5 for a switching toggle. Such a switching toggle, not illustrated in the drawings, can be latched by latching tongues to latching incisions 18 provided on the inner circumference of the receiving aperture 5 to the connecting disk 4. The connecting disk 4 is, thus, connected to the switching toggle in a rotationally fixed manner and is, accordingly, adjusted with the switching toggle when the switching toggle is twisted.

A radially outward-projecting blocking tongue 6 is formed on the outer circumference of the connecting disk 4. The blocking tongue 6 is associated with a pushrod 7 displaceably disposed on the supporting frame 1 as a counter-blocking element. The pushrod 7 is held by a spring element or rubber element 8 in its rest position, in which it is out of engagement with the blocking tongue 6. If, by contrast, the pushrod 7 is in engagement with the blocking tongue 6 (see FIG. 1), the connecting disk 4 can be twisted only in the direction indicated by arrow 9. Thus, the switching toggle, which is coupled to the connecting disk 4 and, by a switch shaft provided thereon, is in drive connection with a switching element, can be twisted only in the direction of arrow 9. The switching element can, for example, be in the form of a momentary switch in that direction of twisting.

A tool placed on the housing 2 of the food processor has, on its bottom part 10, an actuating finger 11 that, when the tool is placed on the housing 2, engages through an insertion aperture 12 provided in the housing wall and presses the pushrod 7 downward against the force of the spring element or rubber element 8 and against the connecting disk 4. When such action occurs, the free end 13 of the pushrod 7 hooks behind the blocking tongue 6. A twisting of the connecting disk 4, and, hence, of the switching toggle connected thereto, counter to the direction indicated by the arrow 9 is, thus, impossible. Because, as previously mentioned above, the switching element that can be actuated through the switching toggle in the direction of twisting indicated by the arrow 9 is in the form of a momentary switch, the food processor can be operated only in momentary operating mode when the tool is in place.

A tool that can be used both in momentary and in sustained operating mode has no actuating finger 11. See FIG. 2. If such a tool is placed on the housing 2, no actuation of the pushrod 7 takes place and, thus, no blocking of one of the twisting movements of the connecting disk 4 takes place either. The connecting disk 4 can be twisted in either direction, as indicated by a double arrow 14 in FIG. 2, and, therefore, the switching element connected to the switching toggle disposed on the connecting disk 4 also can be twisted in either direction. Such a tool can, therefore, be operated in either momentary or sustained mode.

Latching recesses 15 are also formed on the circumference of the connecting disk 4 and interact with a latching tongue 17 secured through a spring-loaded arm 16 on the supporting frame 1. Thus, different switching steps can be permanently set for the sustained operating mode of a tool.

In the example of the embodiment illustrated, only one blocking tongue 6 is shown on the circumference of the connecting disk 4. However, at least one further blocking tongue may be provided in the region of the connecting disk 4 lying opposite the blocking tongue 6 with respect to the central axis of the receiving aperture 5. In such a case, a further pushrod is correspondingly associated with the further blocking tongue. The further pushrod may also, like the pushrod 7, be actuated through a corresponding tool and, thus, a momentary operating mode can be blocked for the tool in question.

The possibility also exists of linking the blocking of one direction of twisting of the connecting disk 4 to a corresponding blocking of a direction of rotation for the tool, in other words, in such a case, a tool can be operated only clockwise or counterclockwise. The blocking device described may also be used to limit the speed of revolution, for example, by a system on the tool to prevent switching up to higher revolutions in sustained operating mode. For such a purpose, an actuating finger provided on the tool in question engages into a blocking element provided at a corresponding point on the connecting disk 4 and, thus, prevents switching positions corresponding to a switching-up to higher revolutions.

We claim:

1. A food processor, comprising:

a housing;

different tools adapted to be placed at said housing;

an electric motor drive coupled to one of said tools when said one tool is placed at said housing; and a switching element actuated in two switching directions, at least one of said two switching directions being blocked as a function of a given one of said tools placed at said housing.

2. The food processor according to claim 1, wherein:

a part is coupled in a rotationally fixed manner to said switching element, said part has a circumference and at least one blocking element disposed on said circumference;

a counter-blocking element is selectively coupled to at least one of said tools when said at least one tool is placed at said housing; and said at least one blocking element blocks rotation of said switching element in one of said two switching directions.

3. The food processor according to claim 2, wherein:

said at least one blocking element has an adjustment path;

said counter-blocking element is a strip-shaped projection; and each of said tools has said strip-shaped projection projecting into said adjustment path of said at least one blocking element when said tools are respectively placed at said housing.

4. The food processor according to claim 2, wherein:
said part is a connecting disk;
said at least one blocking element is a radially outward-projecting blocking tongue; and
said counter-blocking element is a pushrod actuated dependent upon a respective one of said tools being placed in a position to project said pushrod into said adjustment path of said blocking tongue.

5. The food processor according to claim 4, wherein:
said pushrod is displaceable in a blocking direction;
a spring holds said pushrod in a rest position;
at least one of said tools has an actuating finger; and
said pushrod is adjusted in said blocking direction by said actuating finger when said at least one tool is placed at said housing.

6. The food processor according to claim 2, wherein:
said at least one blocking element is a first blocking element and a second blocking element;
said first blocking element blocks rotation of said switching element in a first of said two switching directions; and
said second blocking element blocks rotation of said switching element in a second of said two switching directions.

7. The food processor according to claim 1, wherein said switching element is a momentary switch at least in one of said two switching directions.

8. The food processor according to claim 4, wherein:
said housing has a latching tongue fixedly disposed thereon;
latching recesses are disposed on said circumference of said connecting disk at least for one of said two switching directions; and
said latching tongue engages at least one of said latching recesses.

9. The food processor according to claim 4, wherein:
said housing has a latching tongue;
latching recesses are disposed on said circumference of said connecting disk; and
said latching tongue engages at least one of said latching recesses at least when said switching element is switched in one of said two switching directions.

10. In a food processor having a housing and an electric motor drive, a switching assembly comprising:
different tools adapted to be placed on the housing and coupled to the electric motor drive when one of said tools is placed on said housing; and
a switching element actuated in two directions, at least one of said two directions being blocked as a function of a given one of said tools placed on the housing.

11. The food processor according to claim 10, wherein:
a part is coupled in a rotationally fixed manner to said switching element, said part has a circumference and at least one blocking element disposed on said circumference;
a counter-blocking element is selectively coupled to at least one of said tools when said at least one tool is placed at the housing; and
said at least one blocking element blocks rotation of said switching element in one of said two switching directions.

12. The food processor according to claim 11, wherein:
said at least one blocking element has an adjustment path;
said counter-blocking element is a strip-shaped projection; and
each of said tools has said strip-shaped projection projecting into said adjustment path of said at least one blocking element when said tools are respectively placed at the housing.

13. The food processor according to claim 11, wherein:
said part is a connecting disk;
said at least one blocking element is a radially outward-projecting blocking tongue; and
said counter-blocking element is a pushrod actuated dependent upon a respective one of said tools being placed in a position to project said pushrod into said adjustment path of said blocking tongue.

14. The food processor according to claim 13, wherein:
said pushrod is displaceable in a blocking direction;
a spring holds said pushrod in a rest position;
at least one of said tools has an actuating finger; and
said pushrod is adjusted in said blocking direction by said actuating finger when said at least one tool is placed at the housing.

15. The food processor according to claim 11, wherein:
said at least one blocking element is a first blocking element and a second blocking element;
said first blocking element blocks rotation of said switching element in a first of said two switching directions; and
said second blocking element blocks rotation of said switching element in a second of said two switching directions.

16. The food processor according to claim 10, wherein said switching element is a momentary switch at least in one of said two switching directions.

17. The food processor according to claim 13, wherein:
the housing has a latching tongue fixedly disposed thereon;
latching recesses are disposed on said circumference of said connecting disk at least for one of said two switching directions; and
at least one of said latching recesses is adapted to engage the latching tongue.

18. The food processor according to claim 13, wherein:
the housing has a latching tongue;
latching recesses are disposed on said circumference of said connecting disk; and
at least one of said latching recesses is adapted to engage the latching tongue at least when said switching element is switched in one of said two switching directions.

* * * * *